(12) United States Patent
Gumpoldsberger et al.

(10) Patent No.: US 7,222,707 B2
(45) Date of Patent: May 29, 2007

(54) DOG CLUTCH AND DIFFERENTIAL GEAR HAVING SAME

(75) Inventors: Thomas Gumpoldsberger, Haidershofen (AT); Michael Laus, St. Marien (AT); Rudolf Glassner, Kottes (AT)

(73) Assignee: Eingineering Center Steyr GmbH & Co KG, St. Valentin (AT)

( * ) Notice: Subject to any disclaimer, the term of this patent is extended or adjusted under 35 U.S.C. 154(b) by 143 days.

(21) Appl. No.: 11/048,080

(22) Filed: Feb. 1, 2005

(65) Prior Publication Data

US 2005/0167230 A1    Aug. 4, 2005

(30) Foreign Application Priority Data

Feb. 2, 2004   (AT) ................ GM67/2004

(51) Int. Cl.
*F16D 11/00* (2006.01)
(52) U.S. Cl. ................ 192/69.8; 192/101; 192/114 T
(58) Field of Classification Search ................ 192/65, 192/69, 69.82, 69.7; 475/237, 241
See application file for complete search history.

(56) References Cited

U.S. PATENT DOCUMENTS

| | | | | |
|---|---|---|---|---|
| 1,597,198 A | * | 8/1926 | Neverson | 192/69.81 |
| 2,253,431 A | * | 8/1941 | Christopher | 192/69 |
| 2,883,020 A | * | 4/1959 | Kummich et al. | 192/114 R |
| 5,273,499 A | * | 12/1993 | Friedl et al. | 192/69.8 |
| 5,651,439 A | * | 7/1997 | Bailly | 192/114 T |
| 6,520,305 B2 | * | 2/2003 | Dick | 192/69.8 |

* cited by examiner

*Primary Examiner*—Rodney H. Bonck
(74) *Attorney, Agent, or Firm*—Harness, Dickey & Pierce, P.L.C.

(57) ABSTRACT

A dog clutch operative to provide shiftably connection. A first clutch element includes a plurality of dogs selectively engagable with a plurality of counterdogs coupled to the second clutch element for selectively coupling primary and secondary rotatable parts. The second clutch element further includes a bush coupled to the secondary rotatable part and an intermediate part containing the counterdogs. The intermediate part can be selectively coupled to the bush for selectively coupling the second clutch element and the secondary part.

26 Claims, 7 Drawing Sheets

DOG CLUTCH AND DIFFERENTIAL GEAR HAVING SAME

BACKGROUND OF THE INVENTION

The invention relates to a clutch for the shiftable connection of a primary part to a secondary part, said clutch comprising a dog clutch consisting of a first and of a second clutch half.

Positive clutches of this type are used in the drive train of motor vehicles for the cutting in of drive axles or for the blocking of differential gears. Engagement and disengagement take place by means of the axial displacement of one of the clutch parts, the dogs or teeth provided on their end faces being brought into engagement or out of engagement. Thus, with a minimal installation space, a very high torque can be transmitted positively. The displacement of one clutch part may take place by means of an actuator acting in both directions or, as described in DE-C-4113 128, by means of an actuator acting in only one direction. This requires teeth or dogs with undercut flanks and with a spring acting in the opening direction between the two clutch halves, so that the clutch opens automatically when the torque lapses.

The term "undercut flanks" is to be understood to mean that the dogs of the clutch have, in circumferential section, essentially the form of a trapezium, of which the shorter of the two parallel sides faces away from the counterdogs.

During disengagement and engagement, frictional forces act between the flanks of the clutch dogs, and these frictional forces delay disengagement and have to be overcome by the actuator. If the clutch is designed in such a way that it is disengaged automatically when the torque lapses, this then also means that it cannot be disengaged under load. Both must be avoided when a rapid opening of the clutch in the drive train of a motor vehicle is required, for example for cooperation with electronic action on the brake system (for example, ABS).

The object of the invention is to ensure a rapid opening of a generic clutch even under load.

SUMMARY OF THE INVENTION

According to the invention, this is achieved in that, between the primary part and the secondary part, an intermediate part is provided, which has the counterdogs on its side facing the dogs and, on its side facing away from the dogs, can be positively connected fixedly in terms of rotation to the secondary part via radially displaceable elements (sliding blocks or sliding pieces), the position of these being determined by the position of a shift sleeve.

Thus, the frontal-dog clutch is followed in series by a further positive clutch. The intermediate part belongs with one side to one and the other side to the further positive clutch. However, in the latter, the force-transmitting teeth are not oriented radially, but axially. Thus, high circumferential forces can be transmitted, without an axial force component occurring in this case. The reaction forces of the sliding pieces distributed uniformly on the circumference of the clutch act radially, of course, and therefore cancel one another. The deflecting coupling toothing can therefore be designed with a very large deflection angle, this initially being conducive to a rapid release of the further clutch and consequently ensuring a rapid opening of the dog clutch. Moreover, the centrifugal force can thus also be incorporated into or taken into account in the mode of action. Engagement and disengagement accordingly take place in each case in two phases.

Various embodiments are to be preferred, depending on requirements and on the installation situation. In a first embodiment, the radially displaceable sliding pieces are guided in the intermediate part and can be connected fixedly in terms of rotation via a deflecting coupling toothing to a bush displaceable on the secondary part. For actuation, the shift sleeve has a conical inner face which cooperates with the sliding pieces and which holds these inward on to the deflecting coupling toothing.

The sliding pieces may also be guided in a bush connected fixedly in terms of rotation to the secondary part and be connectable fixedly in terms of rotation to the intermediate part via a deflecting coupling toothing. In a further embodiment, the shift sleeve has a conical outer face which cooperates with the sliding pieces and which moves and holds these outward on to the deflecting coupling toothing, and the bush is displaceable. In yet a further embodiment, the shift sleeve has a conical inner face which cooperates with the sliding pieces and which moves and holds these inward on to the deflecting coupling toothing.

In further embodiments, the sliding pieces have a deflecting coupling toothing on their side nearer to the axis of rotation and, on their side further from the axis of rotation, cooperate with a conical inner face of a shift sleeve. Thus, at higher rotational speeds, the centrifugal force ensures a particularly rapid opening of the further positive clutch.

In a development of the invention, the sliding pieces are sliding blocks which are guided between parallel radial faces and which engage with a tooth or a plurality of teeth into the countertoothing, and a common spring is looped around the sliding pieces.

In a particularly advantageous development of the invention, the dogs and counterdogs have undercut flanks, and, between the primary part and the intermediate part, a spring is provided which endeavors to push these apart from one another. As a result, when the torque lapses, the clutch opens automatically, without an actuator having to be activated, and therefore virtually without delay. Even during disengagement under load, the clutch opens instantaneously as soon as the further clutch is opened.

Finally, the invention also relates to a differential gear having a dog clutch as a differential lock, in which the primary part of the dog clutch is the differential cage and the secondary part is one of the output shafts. Thus, while having the smallest possible installation space, an arrangement satisfying all the requirements to be met by a differential lock is provided. Both an axle differential and a longitudinal differential may be concerned in this context.

BRIEF DESCRIPTION OF THE DRAWINGS

The invention is described and explained below by means of depictions of various embodiments in which.

DETAILED DESCRIPTION

Figure 1:
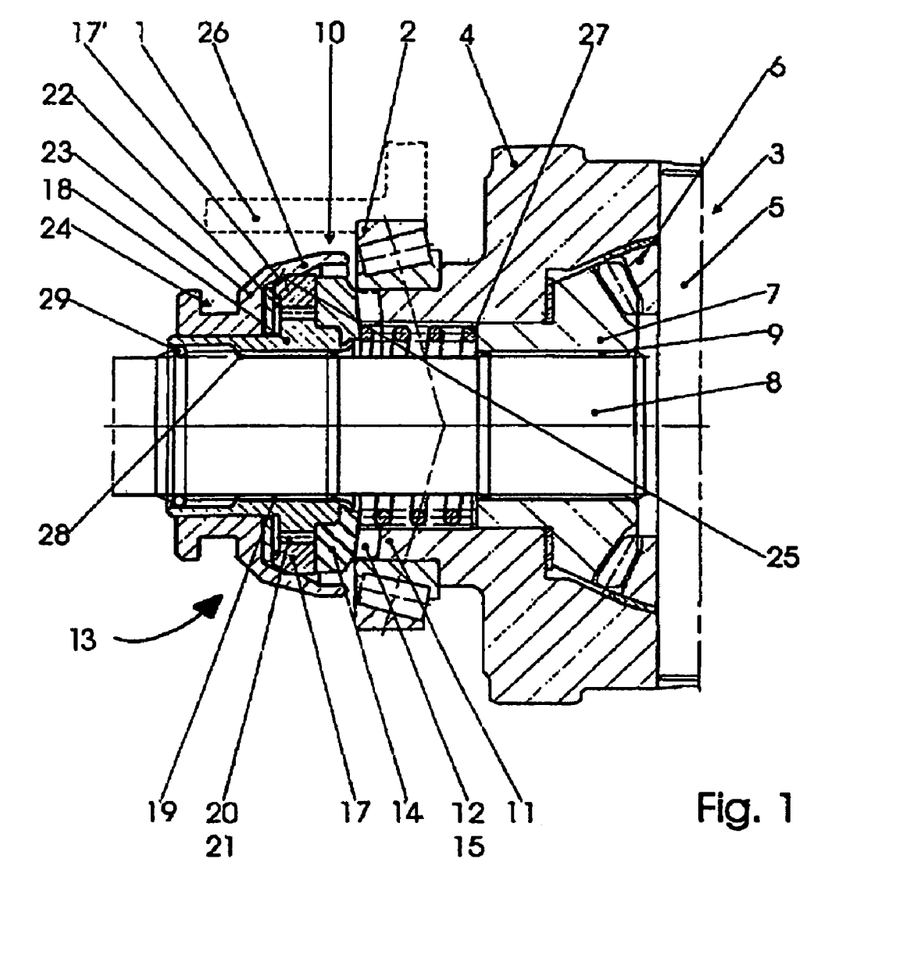
FIG. 1 illustrates a longitudinal section through a first embodiment in a first position.

In FIG. 1, the housing of a differential gear is indicated only partially by broken lines and is designated by 1. A differential gear, designated as a whole by 3, is mounted in said housing in rolling bearings 2 (only one can be seen). The differential gear consists of the rotatably mounted differential cage 4 and of a shaft 5 to the differential pinions 6 and output pinions 7, of which only that connected to an output shaft 8 via a first spline toothing 9 can be seen. The differential gear 3 can be blocked by means of a clutch unit designated as a whole by 10. In the blocked state, the differential cage 4 is connected fixedly in terms of rotation to the output shaft 8.

The clutch unit 10 consists of a first clutch half 11 with dogs 12, of a second clutch half 13 with counterdogs 15, of an intermediate part 14, of sliding pieces 17 and of a bush 18 connected fixedly in terms of rotation to the output shaft 8. The first clutch half 11 is formed on the differential cage 4 and the second clutch half 13 on the intermediate part 14. The dogs 12 and the counterdogs 15 are frontal dogs, that is to say lie approximately in an axially normal plane or in the outer surface area of a very obtuse cone and, in the exemplary embodiment shown, are provided with undercut flanks. That is to say, the torque-transmitting flanks of the dogs are inclined in such a way that the dogs are trapezoidal in circumferential section and, when a torque is transmitted, generate axial force components which endeavor to bring the first clutch half 11 and the second clutch half 3 nearer to one another. Within the scope of the invention, however, the dogs may also be rectangular in circumferential section. Thus, the primary part of the clutch unit consists of the differential cage and of the first clutch half 11 with the dogs 12, and the secondary part consists of the output shaft 8.

The intermediate part 14 has the counterdogs 15 on its side facing the first clutch half 11 and, on the side facing away from the first clutch half, a number of radial guides 16 distributed uniformly over the circumference and having parallel walls, between which a sliding piece is in each case guided displaceably in the radial direction. The bush 18 is connected to the output shaft 8 via a second spline toothing 19 fixedly in terms of rotation, but displaceably in the longitudinal direction. Torque transmission from the intermediate part 14 to the bush 18 takes place via the sliding pieces 17 having a conical face 17'. These are taken up by the intermediate part 14 via the guides 16 and, in the engaged position, are connected to the bush via a deflecting coupling toothing oriented axially. For this purpose, the bush 18 has a coupling toothing 20 running all round in the manner of a gearwheel, and the sliding pieces 17 have only a few coupling teeth 21, three of these in FIG. 3. In an extreme case, a single tooth is sufficient.

The whole of the sliding pieces 17 distributed uniformly over the circumference is held together and pressed outward by a looping spring 22 which is a closed bent ring consisting of a spring wire. A shift sleeve 23 is displaceable in the axial direction on the bush 18. For this purpose, said shift sleeve has, for example, a peripheral groove 24 for the engagement of a shift fork or other actuator, not illustrated. The shift sleeve 23 has a part 26 which diverges in a bell-shaped manner and the inner face 25 of which is designed conically.

The inner face 25 cooperates with the sliding pieces 17. For the engagement of the sliding pieces 17, the shift sleeve 23 is displaced in the axial direction in such a way that the conical inner face 25 pushes the sliding pieces 17 inward, with the result that their teeth 21 are pressed into the coupling toothing 20 of the bush.

Between the output pinion 7 and the intermediate part 14 is arranged a compression spring 27 which endeavors to push the intermediate part 14 away from the first clutch half 11. The bush 18 is limited in its axial displaceability by a stop shoulder 28 and a stop 29.

As regards the mode of operation: in the position of FIG. 1, the clutch is engaged and the differential gear 3 is therefore blocked. The sliding pieces 17 are held by the conical inner face 25 of the shift sleeve 23 in their inner position, in which the deflecting coupling toothing 21 of the sliding pieces is in engagement with the coupling toothing 20 of the bush 18. The radially directed deflection forces occurring during the transmission of a torque are absorbed by the bell-shaped part 26 of the shift sleeve 23. The conical inner face 25 even has a cylindrical step, against which the sliding pieces 17 bear in order to relieve the actuator of axial holding forces.

Figure 2:
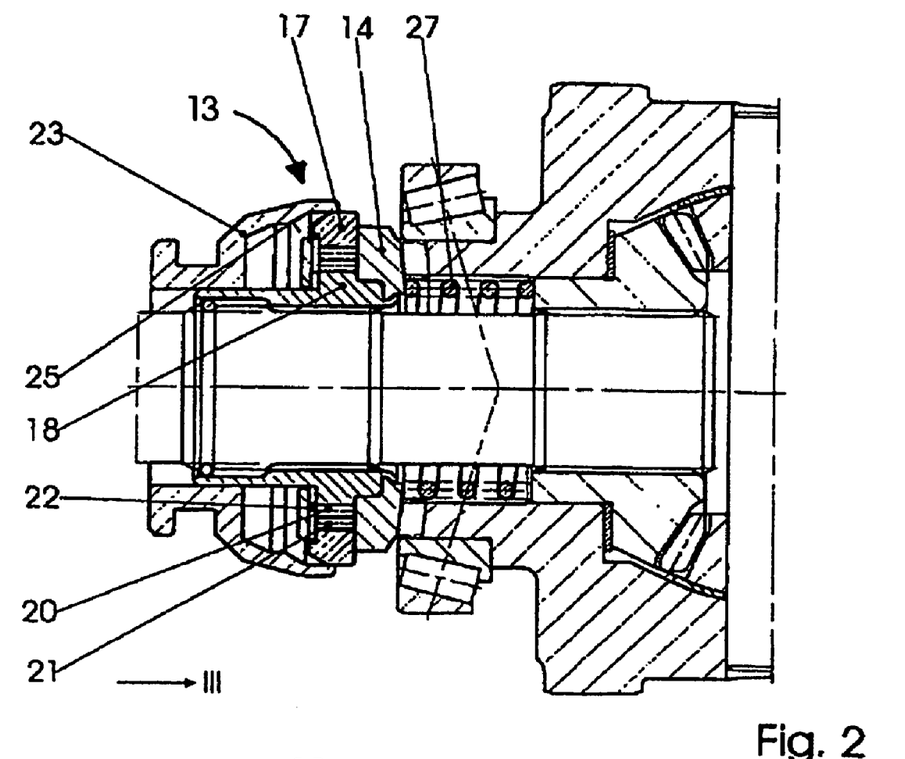
FIG. 2 illustrates the same as FIG. 1 in a second position.
Figure 3:
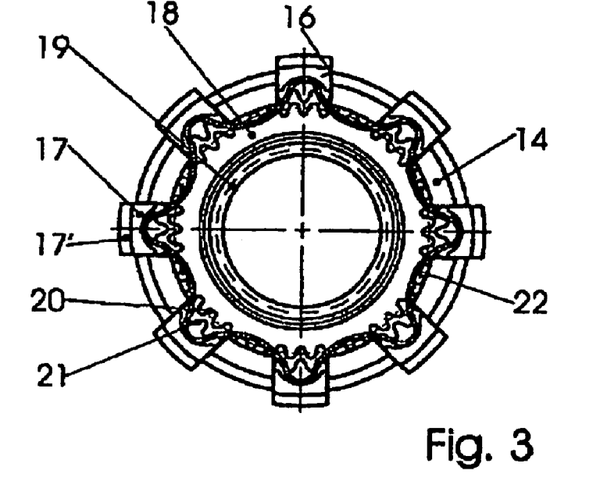
FIG. 3 illustrates an end face view according to III in FIG. 1.

When the clutch device 10 is to be disengaged, a first step leads to the position of FIG. 2 and 3. This is reached by means of the displacement of the shift sleeve 23 to the left, with the result that the conical inner face 25 of the latter releases a larger diameter and the sliding pieces 17 are forced outward by the force of the looping spring 22, by the radially outward-acting force exerted by the deflecting coupling toothing 20, 21 and, where appropriate, also by the centrifugal force, so that the teeth 21 of the sliding pieces 17 come out of engagement with the deflecting coupling toothing 20 of the bush 18. As a result, the intermediate part 14 becomes load-free, and, as a result of further movement of the shift sleeve 23 to the left, can be drawn with its counterdogs 15 out of the dogs 12 of the first clutch half 11; or the compression spring 27 present in the exemplary embodiment shown pushes the intermediate part 14 out of engagement. This leads to the position depicted in FIGS. 4 and 5.

Figure 4:
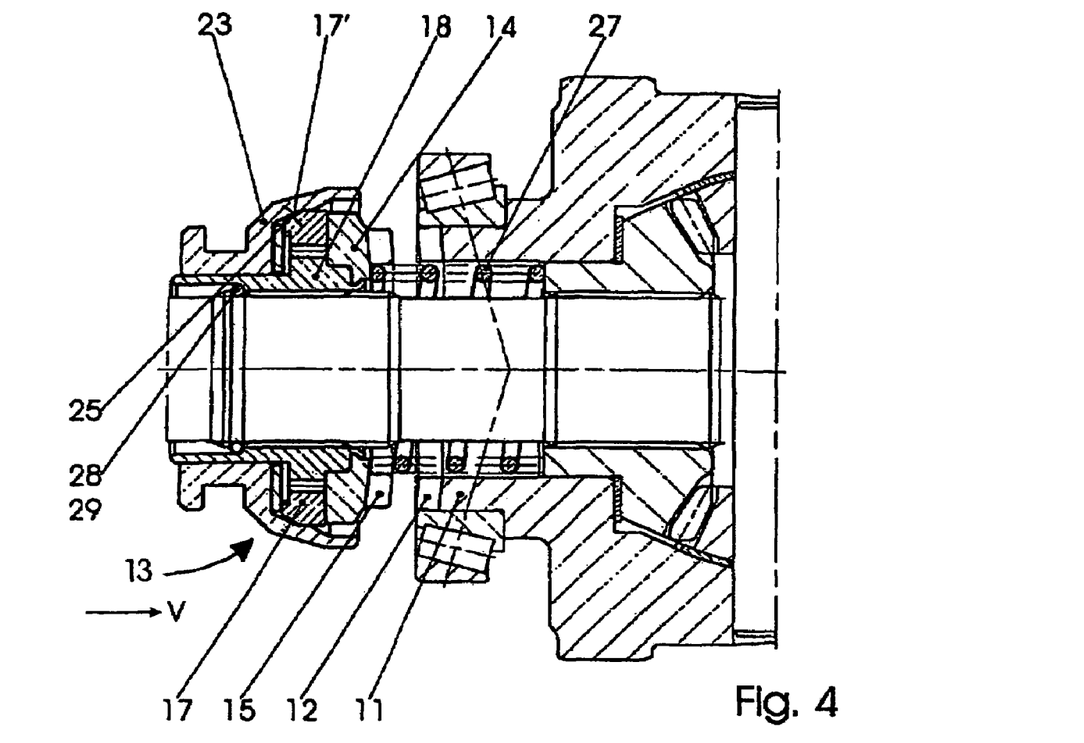
FIG. 4 illustrates the same as FIG. 1 in a third position.
Figure 5:
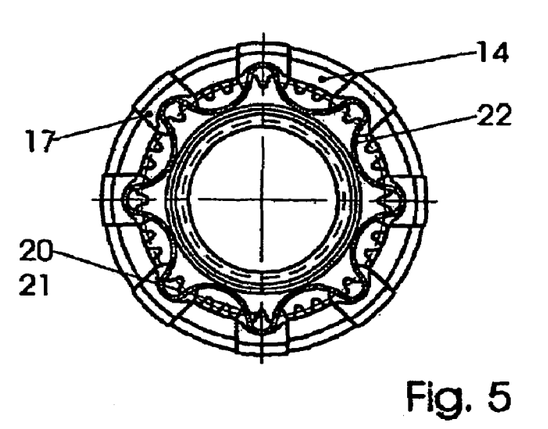
FIG. 5 illustrates an end face view according to V in FIG. 4.

The position of FIG. 4 is reached, in a second phase of movement, in that the spring 27 pushes the intermediate part 14 together with the sliding pieces 17 and with the bush 18 to the right. Since the shift sleeve 23 has not in this case been moved, the sliding pieces 17 slide inward with their chamfered conical faces 17 on the conical inner face 25 of the shift sleeve 23, with the result that the deflecting coupling toothing 20, 21 is brought into engagement again. The clutch can be brought into engagement again from this position by means of the displacement of the shift sleeve 23 to the right.

Figure 6:
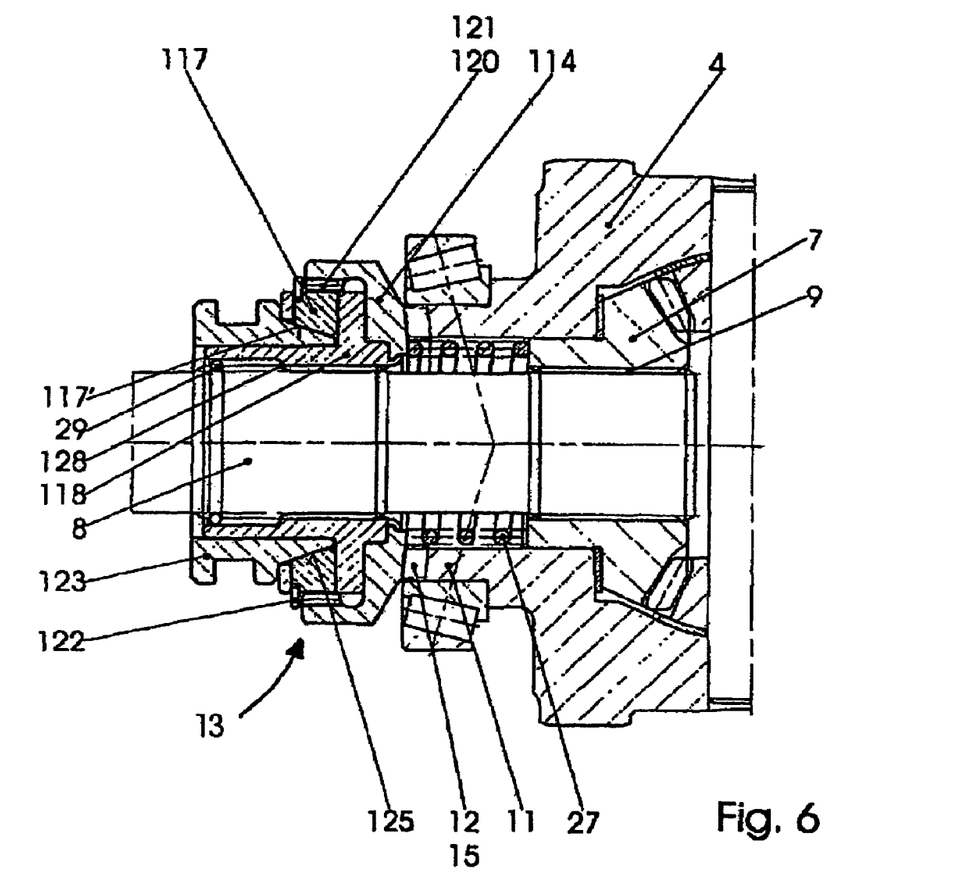
FIG. 6 illustrates a longitudinal section through a second embodiment in a first position.
Figure 7:
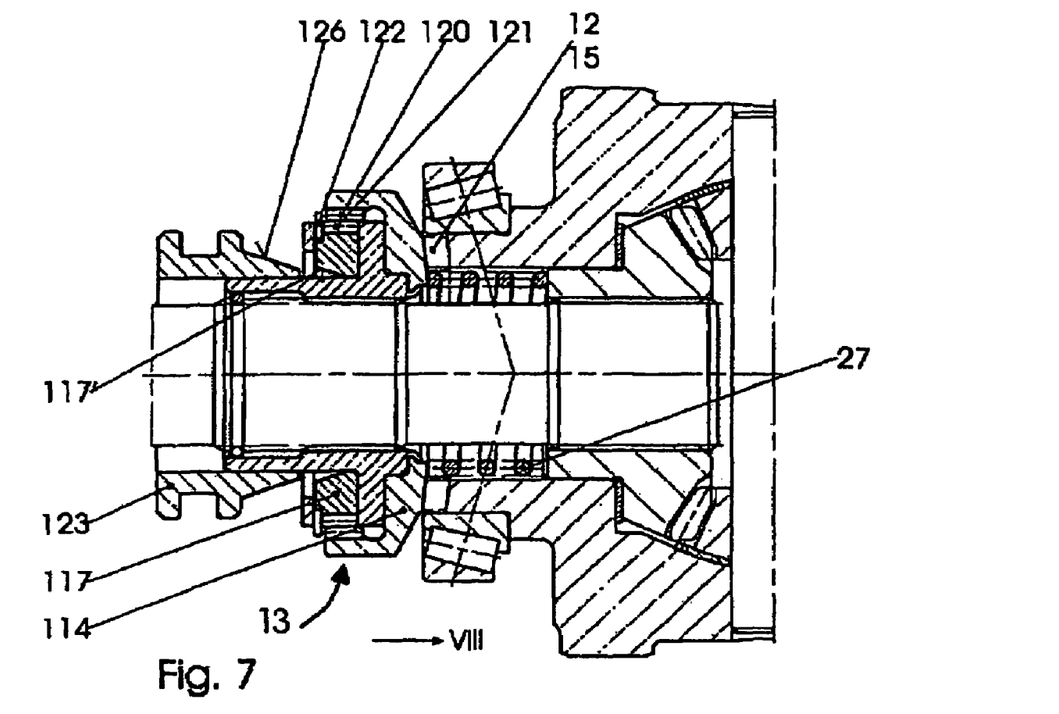
FIG. 7 illustrates the same as FIG. 6 in a second position.
Figure 8:
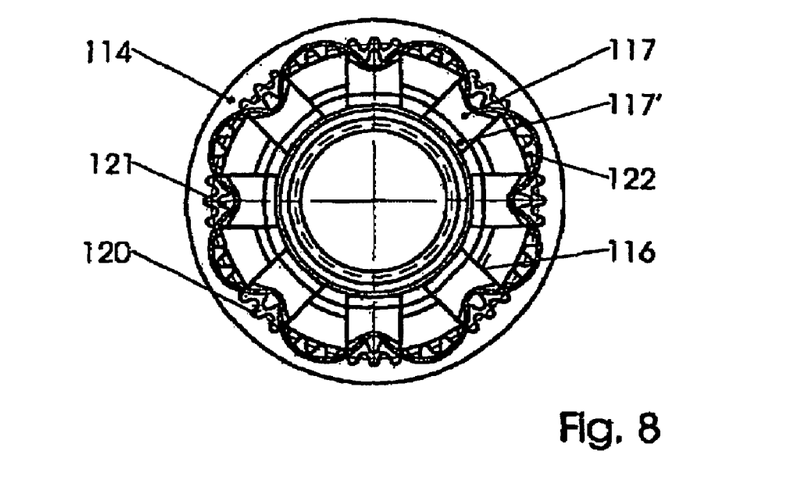
FIG. 8 illustrates an end face view according to VIII in FIG. 7.
Figure 9:
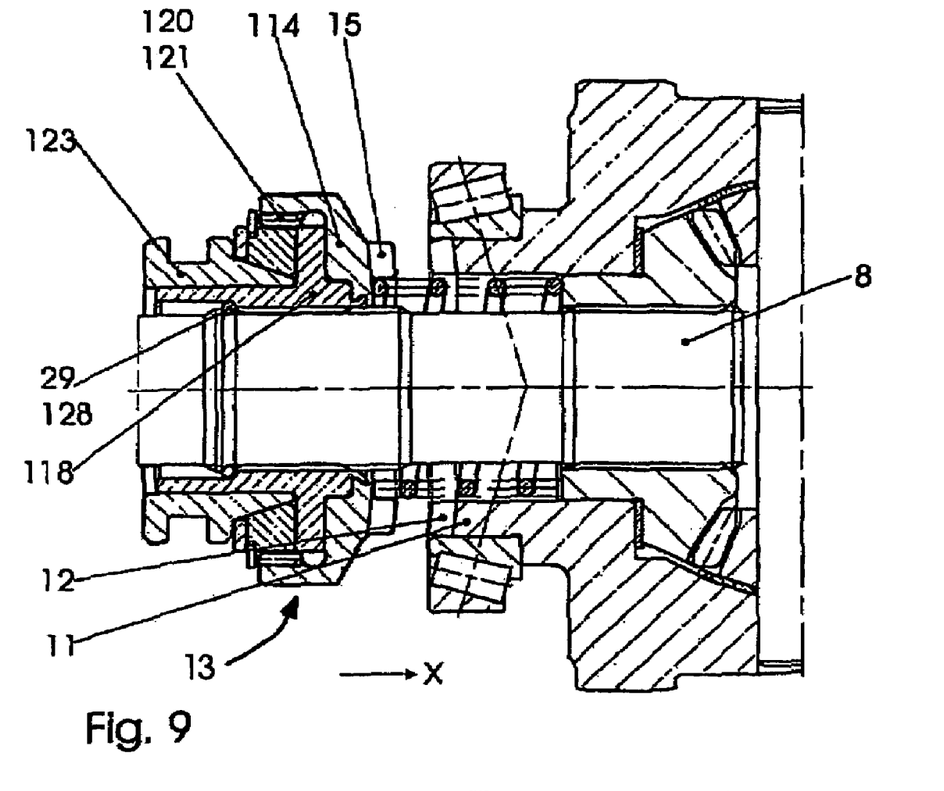
FIG. 9 illustrates the same as FIG. 6 in a third position.
Figure 10:
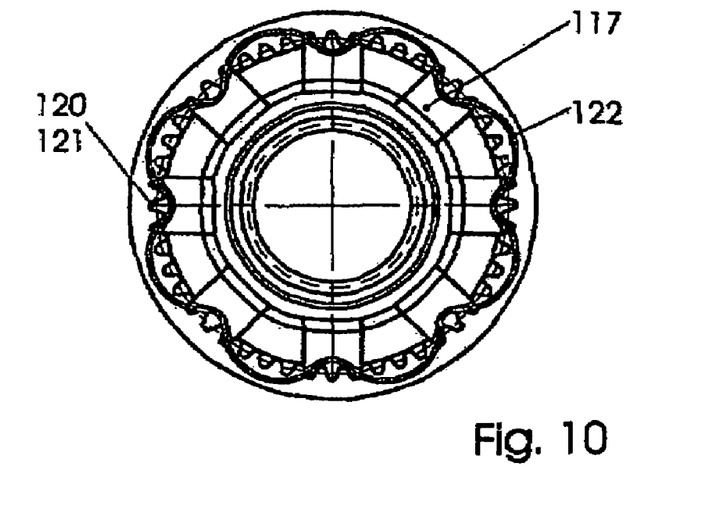
FIG. 10 illustrates an end face view according to X in FIG. 9.

In the embodiment of FIG. 6, identical parts bear the same reference symbols and similar parts bear reference symbols increased by 100. It differs from the preceding embodiment in that the sliding pieces 117 are not guided radially displaceably in the intermediate part 114, but, instead, in the bush 118, and in that the sliding pieces 17 have their deflecting coupling toothing 121 on the outside, where it cooperates with the deflecting coupling toothing 120 which is designed, here, as an inner toothing on the intermediate part 114. For actuation, the sliding pieces 117 have on their inside a conical face 117' which cooperates with a conical face 125 of the shift sleeve 123. Here, the conical face 125 is on the outside of the shift sleeve 123. The phases of movement during engagement and disengagement, illustrated in FIGS. 7, 8 and 9, 10 do not differ from those of the preceding exemplary embodiment.

Figure 11:
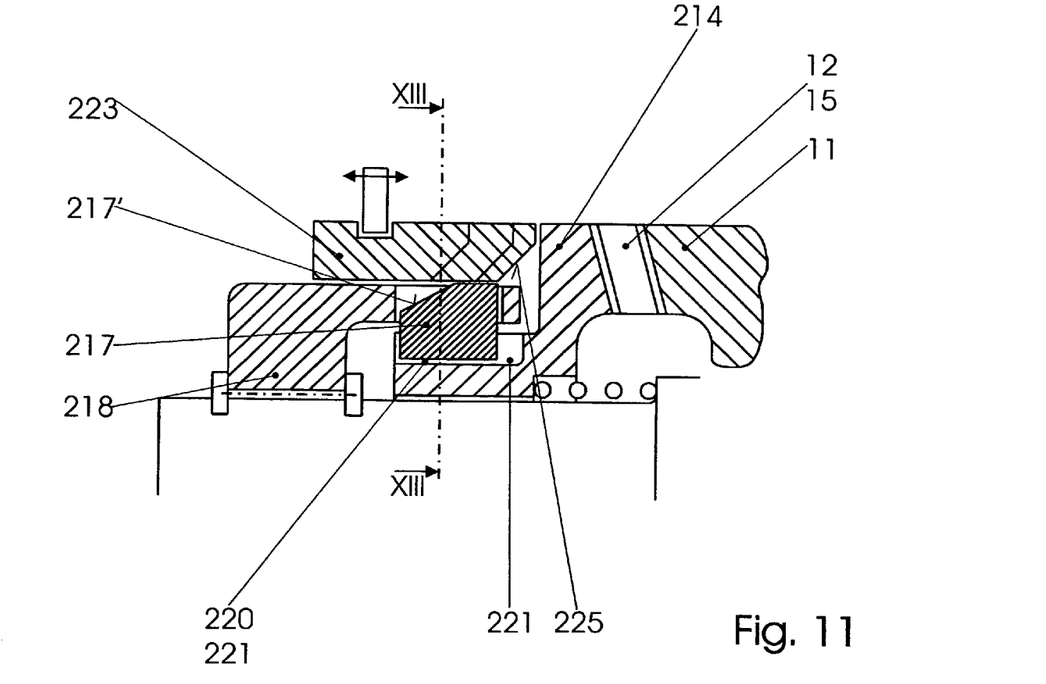
FIG. 11 illustrates a longitudinal section through a third embodiment.
Figure 12:
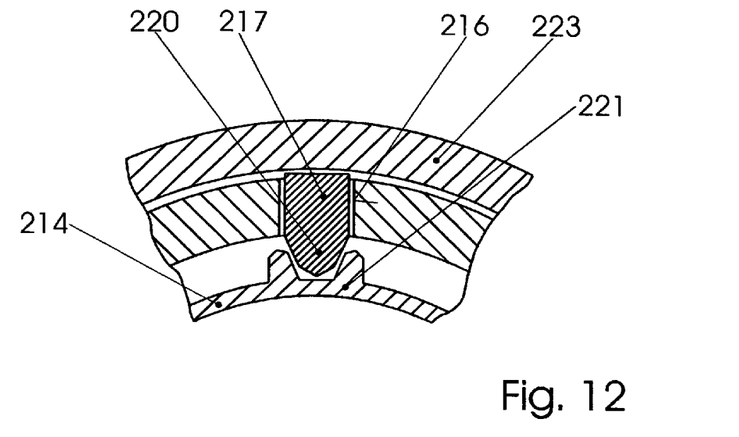
FIG. 12 illustrates a section according to XII in FIG. 11.

In the embodiment of FIG. 11, the specific parts are given reference symbols increased by 200. This differs from that of FIG. 1 in that the bush 218 is connected to the output shaft 8 not only fixedly in terms of rotation, but also fixedly in terms of sliding, and in that the deflecting coupling toothing 221 of the intermediate part 214 is so much longer than that of the sliding pieces 217 that axial displacement is possible between these. Here, too, the shift sleeve 223 can cooperate with the intermediate part 214. Its cooperation with the sliding pieces 17 is the same as in FIG. 1.

The invention claimed is:

1. A dog clutch comprising:
a first clutch element having a plurality of dogs; and
a second clutch element rotatably associated with an output and selectively couplable to said first clutch element, said second clutch element further including:
a bush coupled to said output; and
an intermediate element having a plurality of counterdogs facing said dogs of said first clutch member and selectively engagable with said plurality of dogs, said intermediate element rotationally supported by and selectively couplable to said bush.

2. The dog clutch of claim 1, wherein said plurality of dogs are frontal dogs and said plurality of counterdogs are frontal counterdogs.

3. The dog clutch of claim 1, wherein said second clutch, element further comprises a locking element associated with said bush and said intermediate element, said locking element having an engaged position and a disengaged position and operable to selectively and rotatably couple said bush to said intermediate element when in said engaged position.

4. The dog clutch of claim 3, wherein said locking element is slidably supported by said second clutch element.

5. The dog clutch of claim 3, wherein said locking element is a plurality of locking elements.

6. The dog clutch of claim 3, wherein said locking element is biased toward said disengaged position.

7. The dog clutch of claim 3, wherein said second clutch element further comprises a shift sleeve operable to urge said locking element into an engaged position wherein said bush and said intermediate element are rotatably coupled.

8. The dog clutch of claim 7, wherein said shift sleeve includes a conical surface and said locking element includes a mating conical surface, wherein linear movement of said shift sleeve imparts a radial force on said locking element and urges said locking element into said engaged position.

9. The dog clutch of claim 8, wherein said locking element includes at least one coupling tooth and said second clutch element includes a plurality of mating coupling teeth wherein engagement of said at least one coupling tooth and said plurality of mating coupling teeth rotationally couples said bush and said intermediate element.

10. The dog clutch of claim 8, wherein said plurality of mating coupling teeth are coupled to said bush and said locking element is slidably engaged with said intermediate element.

11. The dog clutch of claim 8, wherein said plurality of mating coupling teeth are coupled to said intermediate element and said locking element is slidably engaged with said bush.

12. The dog clutch of claim 1, further comprising a biasing element disposed between said first clutch element and said second clutch element and biasing said first and second clutch elements toward a disengaged position.

13. The dog clutch of claim 12, wherein said plurality of dogs and plurality of counterdogs have undercut flanks.

14. A drive train for a vehicle comprising:
a first rotating member;
a second rotating member; and
a dog clutch supported by said first and second rotating members and selectively coupling said first and second rotating members, said dog clutch including:
a first clutch element coupled to said first rotating member and having a plurality of dogs;
a second clutch element selectively couplable to said second rotating member and selectively couplable to said first clutch element, said second clutch element including:
a bush coupled to said second rotating member; and
an intermediate element having a plurality of counterdogs facing said dogs of said first clutch member and selectively engagable with said dogs, said intermediate element rotationally supported by and selectively couplable to said bush.

15. The drive train of claim 14, wherein said plurality of dogs are frontal dogs and said plurality of counterdogs are frontal counterdogs.

16. The drive train of claim 14, wherein said second clutch element further comprises a radially displaceable element associated with said bush and said intermediate element, said locking element having an engaged position and a disengaged position and operable to selectively and rotatably couple said bush to said intermediate element when in said engaged position.

17. The drive train of claim 16, wherein said locking element is slidably supported by said second clutch element.

18. The drive train of claim 16, wherein said locking element is a plurality of locking elements.

19. The drive train of claim 16, wherein said locking element is biased toward said disengaged position.

20. The drive train of claim 16, wherein said second clutch element further comprises a shift sleeve operable to urge said locking element into an engaged position wherein said bush and said intermediate element are rotatably coupled.

21. The drive train of claim 20, wherein said shift sleeve includes a conical surface and said locking element includes a mating conical surface, wherein linear movement of said shift sleeve imparts a radial force on said locking element and urges said locking element into said engaged position.

22. The drive train of claim 21, wherein said locking element includes at least one coupling tooth and said second clutch element includes a plurality of mating coupling teeth wherein engagement of said at least one coupling tooth and said plurality of mating coupling teeth rotationally couples said bush and said intermediate element.

23. The drive train of claim 22, wherein said plurality of mating coupling teeth are coupled to said bush and said locking element is slidably engaged with said intermediate element.

24. The drive train of claim 22, wherein said plurality of mating coupling teeth are coupled to said intermediate element and said locking element is slidably engaged with said bush.

25. The drive train of claim 14, further comprising a biasing element disposed between said first clutch element and said second clutch element and biasing said first and second clutch halves toward a disengaged position.

26. The drive train of claim 25, wherein said plurality of dogs and plurality of counterdogs have undercut flanks.

* * * * *

UNITED STATES PATENT AND TRADEMARK OFFICE
CERTIFICATE OF CORRECTION

PATENT NO. : 7,222,707 B2  Page 1 of 1
APPLICATION NO. : 11/048080
DATED : May 29, 2007
INVENTOR(S) : Thomas Gumpoldsberger et al.

It is certified that error appears in the above-identified patent and that said Letters Patent is hereby corrected as shown below:

In the Title Page:

Item (73) Assignee: "Eingineering Center Steyr GmbH & Co KG, St. Valentin (AT)"
should be --Engineering Center Steyr GmbH & Co KG, St. Valentin (AT)--

Signed and Sealed this

Eighteenth Day of May, 2010

David J. Kappos
*Director of the United States Patent and Trademark Office*